F. W. NIEBLING.
INSULATED CAN.
APPLICATION FILED AUG. 31, 1908.
982,848.
Patented Jan. 31, 1911.
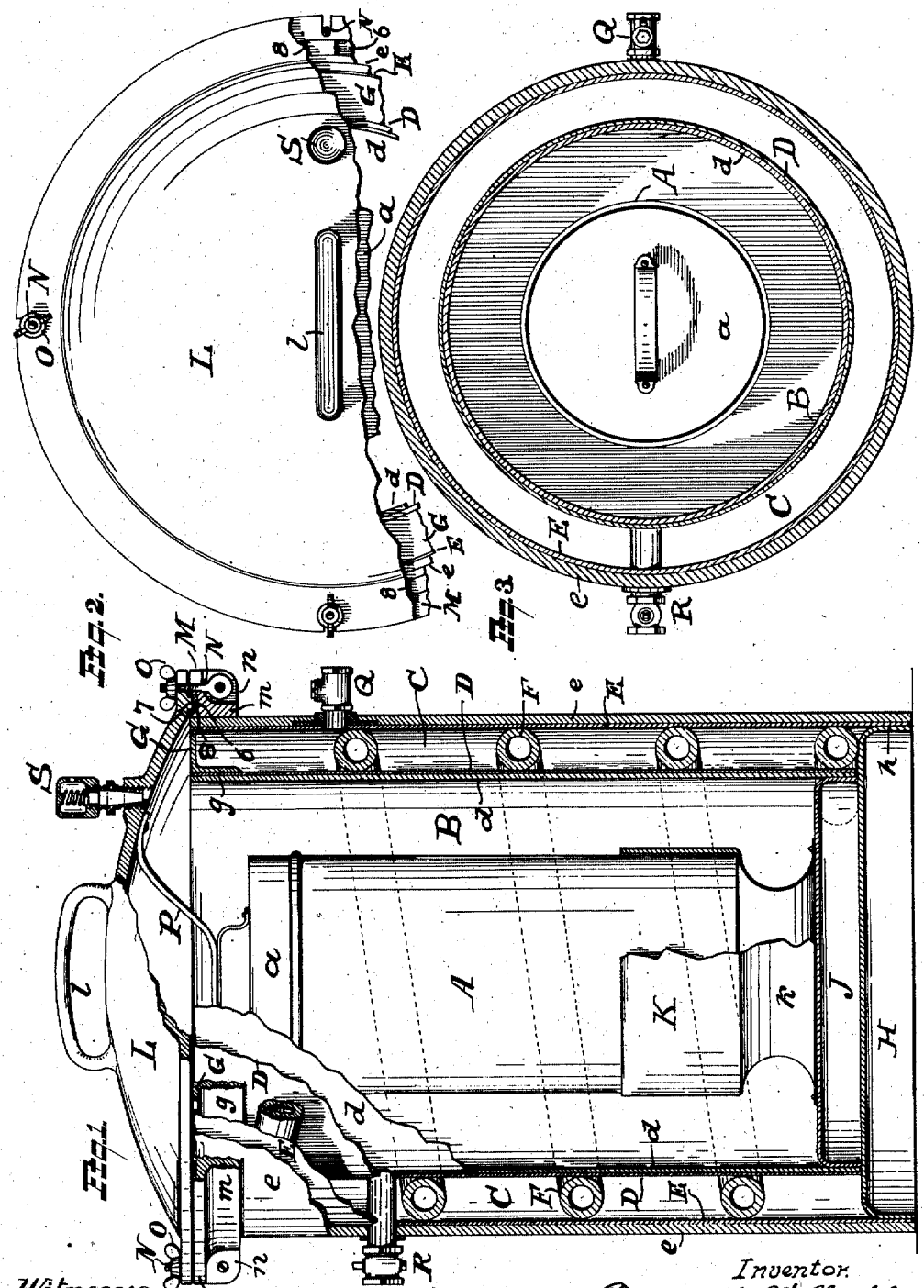
Witnesses
T. LeBeau
G. A. Hattersley
Inventor
Frederick W. Niebling
by C. Spengel atty.

UNITED STATES PATENT OFFICE.

FREDERICK W. NIEBLING, OF CINCINNATI, OHIO.

INSULATED CAN.

982,848. Specification of Letters Patent. Patented Jan. 31, 1911.

Application filed August 31, 1908. Serial No. 450,987.

*To all whom it may concern:*

Be it known that I, FREDERICK W. NIEBLING, a citizen of the United States, and residing at Cincinnati, Hamilton county, State of Ohio, have invented a certain new and useful Insulated Can; and I do declare the following to be a clear, full, and exact description of the invention, attention being called to the accompanying drawing, with the reference characters marked thereon, which form also a part of this specification.

This invention relates to a can or vessel constructed in a certain manner so that a desired temperature, hot or cold, may be maintained inside for an extended length of time. It is intended for instance, to keep cooked foods hot or warm, or ice-cream, iced drinks, bottled goods, cold.

In the following specification and particularly pointed out in the claims at the end thereof, will be found a full description of my invention, together with its manner of use, parts and construction, which latter is also illustrated in the accompanying drawing, in which:—

Figure 1, is a vertical section, partly in elevation, of a vessel constructed in accordance with the plan of my invention. Fig. 2, shows part of a top view of it, and Fig. 3, is a horizontal section of the same.

The matter to be maintained at an even temperature is placed in a compartment formed by an inner vessel A, preferably of sheet-metal and provided with a lid $a$. This vessel is contained in a chamber B, surrounded by an annular vacuum space C, formed between an inner cylindrical wall D and an outer wall E. These walls are rendered rigid and maintained in properly spaced relation by a pipe-coil F used as a spacing means, the diameter of the pipe being equal to the space desired between these two walls which are closely fitted, one against the inside and the other against the outside of the pipe which forms the coil. The outer side of these walls, that is the sides outside of the vacuum-space are covered with suitable insulating material, sheet-cork preferred, one layer or sheet $d$ on wall D, and another one $e$ on wall E. At its upper end this vacuum-space is closed by a ring G, which has a downwardly depending flange $g$, whereby it is connected to one of the walls which inclose said space. Below, this space is closed by the inwardly dished bottom H, which at its flange $h$ is connected to the inside of the outer wall E. There is an additional inner bottom J, spaced from and above bottom H, and connected to the inner wall. On this inner bottom there is provided a socket K elevated and spaced from bottom J, by a base $k$. Inner vessel A is fitted to be received by this socket to be held in position thereby when placed inside of chamber B. To close this insulated vessel there is a lid L, fitted to seat upon a ring M, which has a vertical flange $m$ whereby it is attached in position around the outside of the vessel and at the upper edge thereof. In the upper side of this ring there is an annular groove 6 and to this is fitted a corresponding ridge 7 on the underside of the lid. Packing 8 is placed in groove 6. When the lid is seated, this ridge occupies groove 6 so that a tight closure is obtained.

The lid is held to its seat by bolts N pivotally attached to lugs $n$, which are provided on the underside of ring M and adapted to be turned up and into notches provided in said ring. They also occupy notches in the edge of the lid, this latter being adjusted and placed so that these notches register with the notches in the ring. Nuts O are applied to the ends of these bolts and screwed down so as to bear against the lid.

Means are provided on the underside of lid L, adapted to engage the inner vessel A in a manner to hold the same in position within its socket and also to hold its lid down on it. For such purpose I provide an elastic bar P of spring-metal which at its ends is attached to the underside of lid L and curved downwardly between its ends. When lid L is in position it bears on top of lid $a$ on the inner vessel, or on the handle of the same, if there is one, all as best shown in Fig. 1.

The can is prepared for use by creating a vacuum in space C, a valved attaching-nipple Q, communicating with said space, being provided on the outer wall which permits connection with a suitable suction-device, or air-pump. There is another valved nipple R, which communicates with the inner space B, and through which steam, hot air or water, or cold air or ammonia-gas, as the case may require, is introduced, vessel A, having first been closed, and lid L being in position. Ice may also be packed into space B which surrounds inner vessel A, if cold temperature is to be maintained. Connection to these nipples may be made by any suitable coupling permitting ready, temporary attachment. In all cases the particular temperature in space B is sustained by the vacuum in space C. A conventional safety valve S, is provided to afford relief and prevent pressures which might strain the vessel injuriously. *l*, is the handle of lid L.

Having described my invention I claim as new:

1. In an insulated vessel, the combination of an outer vessel consisting of an outer and of an inner wall spaced therefrom and each wall covered with insulating material, the outer wall on its outside and the inner wall on its inside, an outer bottom having a downwardly turned flange whereby it is connected to the inside of the outer wall and which bottom closes also the space between the two walls, an inner bottom having a similar flange, spaced from the outer bottom and connected to the inner wall, a ring between the upper end of both walls which closes the space between them at their upper ends, an inner vessel spaced from the inner wall, a socket whereby it is supported above the inner bottom, a lid for this inner vessel, a lid for the outer vessel and means to hold each lid in place.

2. In an insulated vessel, the combination of an outer vessel consisting of two walls, a pipe-coil between them used as a means whereby they are concentrically spaced from each other, said coil being fitted around the inner wall and having the outer wall fitted around it, a double bottom connected to these walls, an inner vessel spaced from the outer vessel and lids for each vessel spaced from each other.

In testimony whereof, I hereunto affix my signature in the presence of two witnesses.

FREDERICK W. NIEBLING.

Witnesses:
C. SPENGEL,
W. M. BEINHART.